United States Patent
Chen et al.

(10) Patent No.: US 10,142,928 B2
(45) Date of Patent: Nov. 27, 2018

(54) METHOD AND APPARATUS FOR REDUCING POWER CONSUMPTION, AND MOBILE TERMINAL

(71) Applicant: HUAWEI TECHNOLOGIES CO., LTD., Shenzhen, Guangdong (CN)

(72) Inventors: Liang Chen, Shanghai (CN); Yu Peng, Shanghai (CN); Yuhua Guo, Shanghai (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/307,779

(22) PCT Filed: May 12, 2014

(86) PCT No.: PCT/CN2014/077252
§ 371 (c)(1),
(2) Date: Oct. 28, 2016

(87) PCT Pub. No.: WO2015/172283
PCT Pub. Date: Nov. 19, 2015

(65) Prior Publication Data
US 2017/0055208 A1 Feb. 23, 2017

(51) Int. Cl.
*H04B 1/38* (2015.01)
*H04M 1/00* (2006.01)
(Continued)

(52) U.S. Cl.
CPC ...... *H04W 52/0209* (2013.01); *G06F 9/4893* (2013.01); *H04W 40/005* (2013.01);
(Continued)

(58) Field of Classification Search
CPC .......... H04W 52/0209; H04W 40/005; H04W 52/02; H04W 52/0251; H04B 1/1615
See application file for complete search history.

(56) References Cited

U.S. PATENT DOCUMENTS 9,648,564 B1 * 5/2017 Cui ................. H04W 52/0222
9,880,606 B2 * 1/2018 Zhu ....................... G06F 1/3234
(Continued)

FOREIGN PATENT DOCUMENTS

CN 103336572 10/2013
CN 103336572 A 10/2013
(Continued)

OTHER PUBLICATIONS

International Search Report dated Jan. 28, 2015 for PCT/CN2014/077252.
(Continued)

*Primary Examiner* — Nguyen Vo
(74) *Attorney, Agent, or Firm* — Womble Bond Dickinson (US) LLP (57) ABSTRACT

Embodiments of the present invention disclose a method and apparatus for reducing power consumption, and a mobile terminal, which are used to reduce power consumption of the mobile terminal, and improve user experience. The method in the embodiments of the present invention includes: when a system enters a preset working mode, detecting a first-type application and a second-type application that are installed in the system; changing a type of an alarm of the first-type application, and suspending an alarm of the second-type application, so that the alarm of the first-type application cannot wake up the system in the preset working mode, and that the alarm of the second-type application cannot wake up the system in the preset working mode and/or is not woken up by the system when the system is in an awake state.

18 Claims, 5 Drawing Sheets

When a system enters a preset working mode, detect a first-type application and a second-type application that are installed in the system — S11

Change a type of an alarm of the first-type application, and suspend an alarm of the second-type application, so that the alarm of the first-type application cannot wake up the system in the preset working mode, and that the alarm of the second-type application cannot wake up the system in the preset working mode and/or is not woken up by the system when the system is in an awake state — S12

(51) Int. Cl.
*H04W 52/02* (2009.01)
*H04W 40/00* (2009.01)
*G06F 9/48* (2006.01)

(52) U.S. Cl.
CPC ....... *H04W 52/02* (2013.01); *H04W 52/0251* (2013.01); *Y02B 60/50* (2013.01); *Y02D 70/00* (2018.01)

(56) References Cited

U.S. PATENT DOCUMENTS

| | | | |
|---|---|---|---|
| 2010/0191974 A1 | 7/2010 | Dubhashi et al. | |
| 2010/0229184 A1 | 9/2010 | Satou et al. | |
| 2011/0320801 A1 | 12/2011 | Nimura et al. | |
| 2012/0167118 A1 | 6/2012 | Pingili et al. | |
| 2013/0332589 A1* | 12/2013 | Zhong | G06F 9/46 709/223 |
| 2014/0101674 A1 | 4/2014 | Wang et al. | |
| 2014/0112111 A1* | 4/2014 | Zhu | H04W 52/0251 368/250 |
| 2014/0143568 A1* | 5/2014 | Kim | G06F 1/3206 713/323 |
| 2016/0054789 A1* | 2/2016 | Yang | G06F 9/542 713/323 |
| 2017/0048333 A1 | 2/2017 | Zhong | |
| 2018/0014252 A1* | 1/2018 | Wei | H04W 52/0251 |

FOREIGN PATENT DOCUMENTS

| | | | |
|---|---|---|---|
| EP | 2728471 A1 | 5/2014 | |
| EP | 2728471 A1 | 7/2014 | |
| JP | 2009182443 A | 8/2009 | |
| JP | 2012008800 A | 1/2012 | |
| JP | 2013135242 A | 7/2013 | |
| JP | 2013543613 A | 12/2013 | |
| KR | 20110113179 A | 10/2011 | |
| WO | 2007119550 A1 | 10/2007 | |
| WO | 2013181812 A1 | 12/2013 | |
| WO | 2015172283 A1 | 11/2015 | |

OTHER PUBLICATIONS

Extended European Search Report dated Apr. 7, 2017 for PCT/2014/077252.

* cited by examiner

METHOD AND APPARATUS FOR REDUCING POWER CONSUMPTION, AND MOBILE TERMINAL

CROSS-REFERENCE TO RELATED APPLICATIONS

This application is a national stage of International Application No. PCT/CN2014/077252, filed on May 12, 2014, which is hereby incorporated by reference in its entirety.

TECHNICAL FIELD

The present invention relates to the field of communications technologies, and in particular, to a method and apparatus for reducing power consumption, and a mobile terminal.

BACKGROUND

Android smartphones develop rapidly, and abundant service applications bring people convenience. However, too many application programs lead to excessive power consumption of an Android smartphone and short battery life, which restricts development of the Android smartphone.

In addition to system applications (such as the Google Services Framework "gsf") necessary for system running, the Android smartphone further includes third-party applications (such as Facebook, and Twitter) installed by a user. Each application has a corresponding alarm, where the alarms are classified into a wakeup alarm and a non-wakeup alarm. The wakeup alarm can wake up a system from a standby state at regular time and start an application corresponding to the wakeup alarm; the non-wakeup alarm does not have a function of waking up the system from the standby state at regular time, but can be woken up by the system after the system is woken up, so as to start a corresponding application. For example, when the Android smartphone is in the standby state, a wakeup alarm T1 starts at t1, and wakes up the system from the standby state; after being woken up, the system wakes up a non-wakeup alarm T2; T2 starts at t2, and starting from t2, T2 performs non-active data service interaction with a server until moment t3. Therefore, in a period from t2 to t3, T2 does not actively interact with the server, causing a waste of W1 power consumption in the period from t2 to t3; in a period from t1 to t2, T1 only performs a simple response to the server without substantial content interaction, also causing a waste of W2 power consumption in the period from t1 to t2.

SUMMARY

In view of the foregoing defects, embodiments of the present invention provide a method and apparatus for reducing power consumption, and a mobile terminal, which are used to reduce power consumption of the mobile terminal, and improve user experience.

A first aspect of the present invention provides a method for reducing power consumption, where the method may include:

when a system enters a preset working mode, detecting a first-type application and a second-type application that are installed in the system; and changing a type of an alarm of the first-type application, and suspending an alarm of the second-type application, so that the alarm of the first-type application cannot wake up the system in the preset working mode, and that the alarm of the second-type application cannot wake up the system in the preset working mode and/or is not woken up by the system when the system is in an awake state.

With reference to the first aspect, in a first possible implementation manner, after the changing a type of an alarm of the first-type application, and suspending an alarm of the second-type application, and after the system is manually woken up, the method further includes: starting the first-type application and the second-type application, and restoring the alarm of the first-type application and resuming the second-type application.

With reference to the first aspect, or the first possible implementation manner of the first aspect, in a second possible implementation manner, the first-type application and the second-type application are third-party applications, and the detecting a first-type application and a second-type application that are installed in the system includes: detecting thirty-party applications installed in the system; acquiring license information of the third-party applications; determining, according to the license information, whether the third-party applications have an alarm permit or a wakeup permit; and selecting the first-type application and the second-type application from third-party applications that are determined to have the alarm permit or the wakeup permit, where the first-type application is specifically a third-party application that is not frequently used by a user and has the alarm permit or the wakeup permit, and the second-type application is specifically a third-party application that is not used by the user for a long time and has the alarm permit or the wakeup permit.

With reference to the second possible implementation manner of the first aspect, in a third possible implementation manner, the detecting thirty-party applications installed in the system includes: acquiring installation information of an application installed in the system; determining, according to the installation information, whether the application is a system application; and if the application is not a system application, determining that the application is a thirty-party application.

With reference to the second possible implementation manner of the first aspect, or the third possible implementation manner of the first aspect, in a fourth possible implementation manner, the selecting the first-type application and the second-type application from third-party applications that are determined to have the alarm permit or the wakeup permit includes: selecting the first-type application and the second-type application according to activity logs of the third-party applications that have the alarm permit or the wakeup permit.

With reference to the first aspect, or the first possible implementation manner of the first aspect, or the second possible implementation manner of the first aspect, or the third possible implementation manner of the first aspect, or the fourth possible implementation manner of the first aspect, in a fifth possible implementation manner, the alarm of the first-type application includes at least one of a wakeup alarm or a non-wakeup alarm, and the alarm of the second-type application includes at least one of a wakeup alarm or non-wakeup alarm:

the changing a type of an alarm of the first-type application includes: changing the wakeup alarm in the first-type application to the non-wakeup alarm; and the suspending an alarm of the second-type application includes: suspending the wakeup alarm and the non-wakeup alarm in the second-type application.

With reference to the fifth possible implementation manner of the first aspect, in a sixth possible implementation manner, the preset working mode is a sleep mode.

A second aspect of the present invention further provides an apparatus for reducing power consumption, where the apparatus may include:

a detection module, configured to: when a system enters a preset working mode, detect a first-type application and a second-type application that are installed in the system; and a setting module, configured to: change a type of an alarm of the first-type application, and suspend an alarm of the second-type application, so that the alarm of the first-type application cannot wake up the system in the preset working mode, and that the alarm of the second-type application cannot wake up the system in the preset working mode and/or is not woken up by the system when the system is in an awake state.

With reference to the second aspect, in a first possible implementation manner, the apparatus for reducing power consumption further includes:

a restoration module, configured to: after the type of the alarm of the first-type application is changed, and the alarm of the second-type application is suspended, and after the system is manually woken up, start the first-type application and the second-type application, and restore the alarm of the first-type application and resume the second-type application.

With reference to the second aspect, or the first possible implementation manner of the second aspect, in a second possible implementation manner, the first-type application and the second-type application are third-party applications, and the detection module further includes:

a first detection module, configured to detect third-party applications installed in the system;

a first acquiring module, configured to acquire license information of the third-party applications;

a first judging module, configured to determine, according to the license information, whether the third-party applications have an alarm permit or a wakeup permit; and a first selection module, configured to: after the first judging module determines that the third-party applications have the alarm permit or the wakeup permit, select the first-type application and the second-type application from the third-party applications that are determined to have the alarm permit or the wakeup permit, where the first-type application is specifically a third-party application that is not frequently used by a user and has the alarm permit or the wakeup permit, and the second-type application is specifically a third-party application that is not used by the user for a long time and has the alarm permit or the wakeup permit.

With reference to the second possible implementation manner of the second aspect, in a third possible implementation manner, the first detection module includes:

a second acquiring module, configured to acquire installation information of an application installed in the system;

a second judging module, configured to determine, according to the installation information, whether the application is a system application; and a second determining module, configured to: after the second judging module determines that the application is not a system application, determine that the application is a third-party application.

With reference to the second possible implementation manner of the second aspect, or the third possible implementation manner of the second aspect, in a fourth possible implementation manner, the first selection module is specifically configured to: after the first judging module determines that the third-party applications have the alarm permit or the wakeup permit, select the first-type application and the second-type application according to activity logs of the third-party applications that have the alarm permit or the wakeup permit.

With reference to the first possible implementation manner of the second aspect, or the second possible implementation manner of the second aspect, or the third possible implementation manner of the second aspect, or the fourth possible implementation manner of the second aspect, in a fifth possible implementation manner, the alarm of the first-type application includes at least one of a wakeup alarm or a non-wakeup alarm, and the alarm of the second-type application includes at least one of a wakeup alarm or a non-wakeup alarm; and the setting module includes: a first setting module, configured to change the wakeup alarm in the first-type application to the non-wakeup alarm; and a second setting module, configured to suspend the wakeup alarm and the non-wakeup alarm in the second-type application.

With reference to the first possible implementation manner of the second aspect, or the second possible implementation manner of the second aspect, or the third possible implementation manner of the second aspect, or the fourth possible implementation manner of the second aspect, or the fifth possible implementation manner of the second aspect, in a sixth possible implementation manner, the preset working mode is a sleep mode.

A third aspect of the present invention provides a mobile terminal, where the mobile terminal may include: a memory, a processor and the apparatus for reducing power consumption provided in the foregoing second aspect; where the memory is configured to store an application, the processor is configured to run the application stored by the memory, and the apparatus for reducing power consumption is configured to reduce power consumption of the mobile terminal when the processor runs the application.

It may be learned from the foregoing technical solutions that, the method for reducing power consumption provided in the embodiments of the present invention has the following advantages: when a system of a mobile terminal enters a preset working mode, a type of an alarm of a first-type application detected in the system is changed, and afterwards, the alarm in the first-type application cannot actively wake up the system, so as not to cause W2 power consumption generated by waking up the system; and an alarm of a second-type application detected in the system is suspended, and afterwards, the alarm in the second-type application suspends working, so as not to cause W2 power consumption generated when some alarms in the second-type application actively wake up the system, and/or W1 power consumption generated when some alarms are woken up by a system that is in an awake state, which reduces power consumption of the mobile terminal and improves user experience.

BRIEF DESCRIPTION OF DRAWINGS

To describe the technical solutions in the embodiments of the present invention more clearly, the following briefly introduces the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention provide a method and apparatus for reducing power consumption, which are used to reduce power consumption of a mobile terminal, and to improve user experience. In addition, the embodiments of the present invention further provide a mobile terminal. In the following, specific embodiments are used for detailed description separately.

Figure 1:
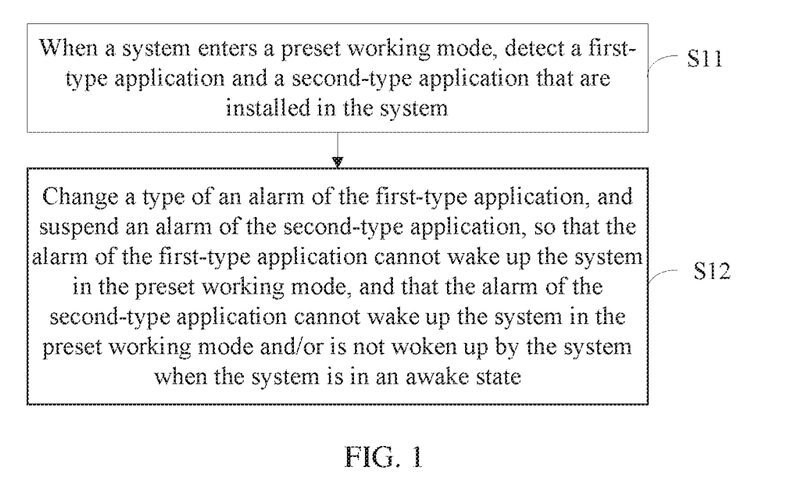
FIG. 1 is a schematic flowchart of a method for reducing power consumption according to an embodiment of the present invention.

As shown in FIG. 1, a method for reducing power consumption, applied to a mobile terminal, may include the following steps:

S11. When a system enters a preset working mode, detect a first-type application and a second-type application that are installed in the system.

Both the foregoing first-type application and second-type application are third-party applications installed in the system, where the first-type application is a third-party application that is not frequently used, and the second-type application is a third-party application that is not used for a long time. The preset working mode is a sleep mode of the mobile terminal.

The first-type application and the second-type application are installed in the mobile terminal, where an alarm of the first-type application may be at least one of a wakeup alarm or a non-wakeup alarm, and an alarm of the second-type application may also be at least one of a wakeup alarm or a non-wakeup alarm. Specifically, the wakeup alarm can wake up the system of the mobile terminal when the system enters the sleep mode; the non-wakeup alarm cannot be started to wake up the system of the mobile terminal when the system enters the sleep mode, but when the system is in an awake state, the non-wakeup alarm can be woken up, so that a corresponding application is triggered to start, and to perform data service interaction.

S12. Change a type of an alarm of the first-type application, and suspend an alarm of the second-type application, so that the alarm of the first-type application cannot wake up the system in the preset working mode, and that the alarm of the second-type application cannot wake up the system in the preset working mode and/or is not woken up by the system when the system is in an awake state.

The alarm of the first-type application may be changed to the non-wakeup alarm. It may be understood that, because the first-type application includes at least one of the wakeup alarm or the non-wakeup alarm, the changing a type of an alarm of the first-type application is specifically changing the type of the wakeup alarm in the first-type application to non-wakeup. Therefore, after the alarm type is changed, all alarms in the first-type application are non-wakeup alarms, so that all the non-wakeup alarms in the first-type application cannot actively wake up the system in the sleep mode.

The second-type application also includes at least one of the wakeup alarm or the non-wakeup alarm; therefore, in the foregoing step S12, that the alarm of the second-type application cannot wake up the system in the preset working mode and/or is not woken up by the system when the system is in an awake state specifically includes the following cases:

A1. When the second-type application includes both the wakeup alarm and the non-wakeup alarm, the wakeup alarm and the non-wakeup alarm in the second-type application are suspended. Then, the wakeup alarm in the second-type application cannot actively wake up the system in the preset working mode; after the system is woken up, the non-wakeup alarm in the second-type application cannot be woken up by the awake system either, and therefore cannot trigger the second-type application to start, or to further perform service interaction.

A2. When the second-type application includes only the wakeup alarm, the wakeup alarm is suspended. Then, the wakeup alarm cannot actively wake up the system in the preset working mode.

A3. When the second-type application includes only the non-wakeup alarm, the non-wakeup alarm is suspended. Then, the non-wakeup alarm is not woken up by the system when the system is in the awake state.

That is, the second-type application in the foregoing step S12 may be in any case of the foregoing A1, A2, and A3.

In this embodiment of the present invention, when a system enters a preset working mode, a first-type application and a second-type application in the system are detected, a type of an alarm of the first-type application is changed, and an alarm of the second-type application is suspended; then, the system cannot be woken up by using the alarm of the first-type application when the system in the preset working mode, and an alarm function of the second-type application is suspended, that is, the system cannot be woken up by using the alarm, and after the system is woken up, the alarm of the second-type application cannot be woken up either, and therefore cannot trigger the second-type application to further perform service interaction.

It may be understood that, after the system enters the sleep mode, the type of the alarm of the first-type application is changed, and the alarm of the second-type application is suspended. Afterwards, the system may be manually woken up, and the alarm of the first-type application may be manually restored and the second-type application may be manually resumed.

It may be understood that, correspondingly, the alarm, in the first-type application, whose type is changed is restored to the original type, and the alarm function of the second-type application is enabled again.

Figure 2:
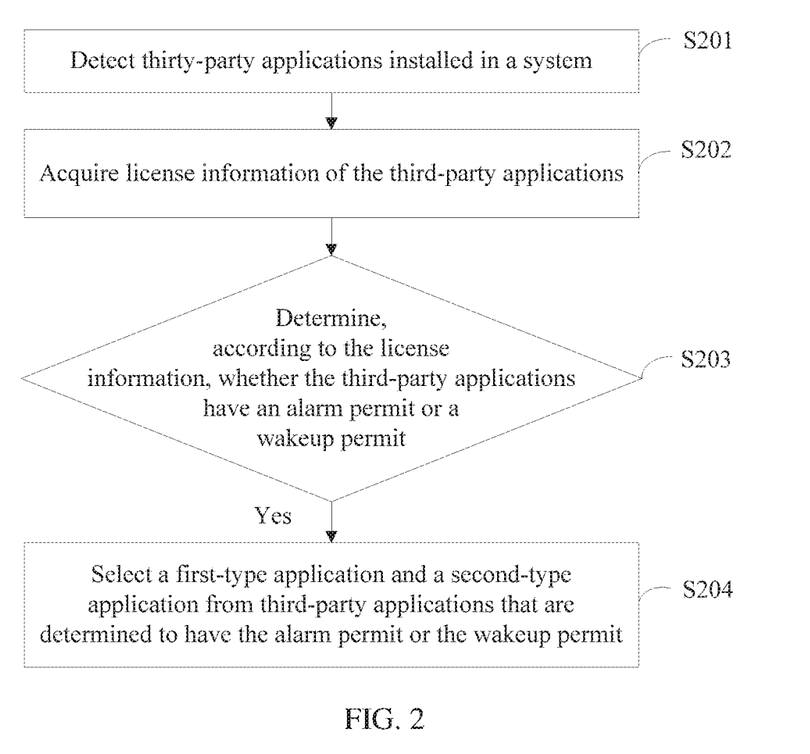
FIG. 2 is a schematic flowchart of a method for reducing power consumption according to another embodiment of the present invention.

As shown in FIG. 2, further description is made in detail on the embodiment provided in the foregoing FIG. 1 is further described in detail. The foregoing step S11 may specifically include steps:

S201. Detect thirty-party applications installed in the system.

In actual application, a system application and a third-party application are generally installed in the mobile terminal, for example, Facebook and Twitter, which are third-party applications. In the third-party applications, some can start an alarm to wake up the system from the sleep mode, and these alarms may have no substantial content interaction with a server, and the server also does not restrict interaction response time. In addition, after the system is woken up, non-wakeup alarms in some third-party applications can be woken up by the system, and then start applications thereof afterwards.

S202. Acquire license information of the third-party applications.

It may be understood that, not all alarms of the third-party applications have a wakeup function. An alarm that has the wakeup function is specifically described in the license information carried by the third-party applications, for example, the license information may include information about an alarm permit or a wakeup permit.

S203. Determine, according to the license information, whether the third-party applications have an alarm permit or a wakeup permit.

After it is determined that the third-party applications have the alarm permit or the wakeup permit, go to step S204.

S204. Select the first-type application and the second-type application from third-party applications that are determined to have the alarm permit or the wakeup permit.

Afterwards, the third-party applications that are determined to have the alarm permit or the wakeup permit may be added to an activity log list, where an activity log generally records an activity situation of a third-party application, that is, a use situation of a user, including a star time, and the like.

Therefore, the selecting the first-type application and the second-type application from third-party applications that are determined to have the alarm permit or the wakeup permit specifically includes: selecting, according to activity logs, the first-type application and the second-type application from the third-party applications that have the alarm permit or the wakeup permit. An application that is installed by the user but not frequently used is selected as the first-type application according to the activity logs, and an application that is not used for a long time or has never been used is used as the second-type application.

In another embodiment, the third-party applications that have the alarm permit or the wakeup permit may be added to the list, so that the user selects the first-type application and the second-type application from the list, and the system finally determines the first-type application and the second-type application according to a result of selection by the user.

This embodiment of the present invention provides a method for selecting, by a system, a first-type application and a second-type application, where after third-party applications in the system are detected, license information of the third-party applications is acquired, and it is determined, by using the license information, whether the third-party applications have an alarm permit or a wakeup permit. In third-party applications that have the alarm permit or the wakeup permit, a third-party application that is not frequently used is further selected as the first-type application, and a third-party application that is not used for a long time is selected as the second-type application.

Figure 3:
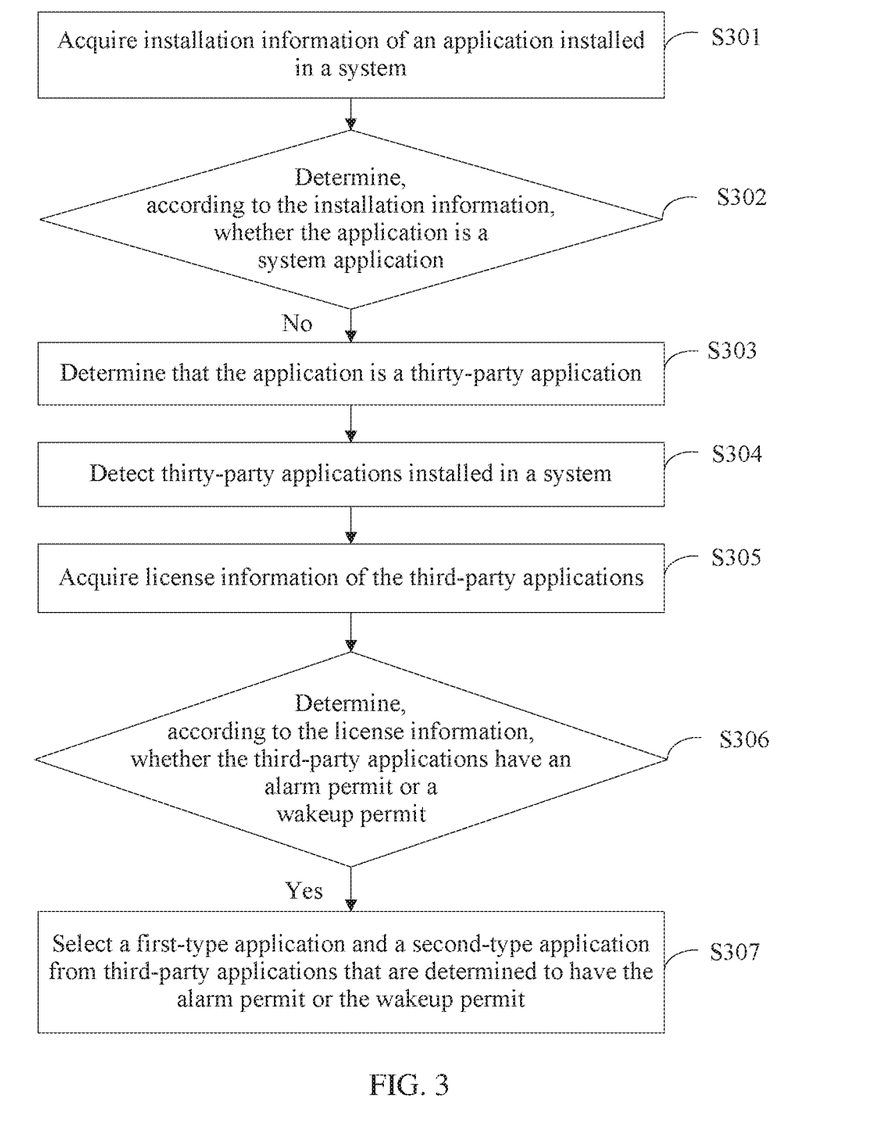
FIG. 3 is a schematic flowchart of a method for reducing power consumption according to another embodiment of the present invention.

An embodiment of the present invention further provides a method for detecting third-party applications in a system. Specifically, as shown in FIG. 3, the embodiment provided in the foregoing FIG. 2 is further described in detail, and the method for reducing power consumption may include the following steps:

S301. Acquire installation information of an application installed in the system.

Installation information of all applications installed in the system is acquired, including a system application and a third-party application.

S302. Determine, according to the installation information, whether the application is a system application.

It is identified, according to the acquired installation information, that the application is a system application or a third-party application. If it is determined, according to the installation information, that the application is not a system application, then it is determined that the application is a third-party application.

S303. If the application is not a system application, determine that the application is a thirty-party application.

S304 to S307.

Steps S304 to S307 are the same as the foregoing steps S201 to 204, and details are not described herein again.

In this embodiment of the present invention, installation information of all applications in a system is acquired, and it is determined, by using the installation information, whether an application is a system application, and if the application is not a system application, it is determined that the application is a third-party application. Afterwards, license information of third-party applications is acquired, and it is determined, by using the license information, whether the third-party applications have an alarm permit or a wakeup permit, and if the third-party applications have the alarm permit or the wakeup permit, according to a result of use and selection, by a user, of the third-party applications that have the alarm permit or the wakeup permit, a third-party application that is not frequently used and has the alarm permit or the wakeup permit is further selected as a first-type application, and a third-party application that is not used for a long time and has the alarm permit or the wakeup permit is selected as a second-type application.

In actual application, when the system enters a sleep mode, if an application that is not frequently used by the user is detected, a wakeup alarm in the application is changed to a non-wakeup alarm; in this way, alarms in applications that are not frequently used by the user are all non-wakeup alarms and, in this case, cannot wake up the system from the sleep mode. Therefore, W2 power consumption generated because the wakeup alarm wakes up the system from the sleep mode does not occur. If an application that is not used for a long time is detected, an alarm in the application is suspended; in this way, a wakeup alarm in the application that is not used for a long time cannot wake up the system in the sleep mode, and when the system is in an awake state, a non-wakeup alarm cannot be woken up by the system, and therefore cannot trigger the application to start, or to perform service interaction. This avoids W2 power consumption generated when the wakeup alarm actively wakes up the system and W2 power consumption generated when the non-wakeup alarm is woken up for service interaction. Therefore, from the perspective of an entire mobile terminal, compared with the prior art, W1 power consumption and W2 power consumption are reduced, thereby reducing electricity consumption of the mobile terminal, and improving user experience.

Figure 4A:
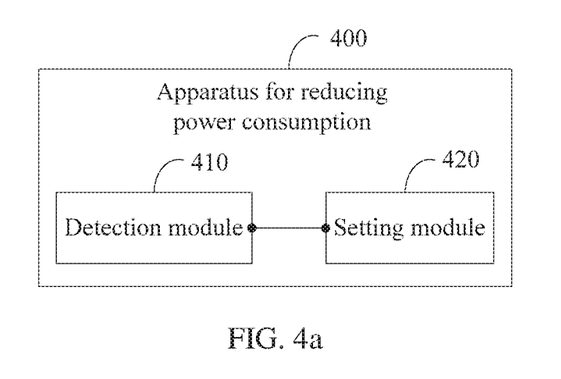
FIG. 4a is a schematic structural diagram of an apparatus for reducing power consumption according to an embodiment of the present invention.

As shown in FIG. 4a, an embodiment of the present invention further provides an apparatus 400 for reducing power consumption, where the apparatus 400 is applied to a mobile terminal, and may include:

a detection module 410, configured to: when a system enters a preset working mode, detect a first-type application and a second-type application that are installed in the system; and a setting module 420, configured to: change a type of an alarm of the first-type application, and suspend an alarm of the second-type application, so that the alarm of the first-type application cannot wake up the system in the preset working mode, and that the alarm of the second-type application cannot wake up the system in the preset working mode and/or is not woken up by the system when the system is in an awake state.

The first-type application and the second-type application are installed in the mobile terminal, where the alarm of the first-type application may be at least one of a wakeup alarm or a non-wakeup alarm, and the alarm of the second-type application may also be at least one of a wakeup alarm or a non-wakeup alarm. Specifically, the wakeup alarm can wake up the system of the mobile terminal when the system enters a sleep mode; and the non-wakeup alarm cannot be started to wake up the system of the mobile terminal when the system enters the sleep mode, but when the system is in the awake state, the non-wakeup alarm can be woken up, so that a corresponding application is triggered to start, and to perform data service interaction.

The alarm of the first-type application may be changed to the non-wakeup alarm. It may be understood that, because the first-type application includes at least one of the wakeup alarm or the non-wakeup alarm, the changing a type of an alarm of the first-type application is specifically changing the type of the wakeup alarm in the first-type application to non-wakeup. Therefore, after the alarm type is changed, all alarms in the first-type application are non-wakeup alarms, so that all the non-wakeup alarms in the first-type application cannot actively wake up the system in the sleep mode.

The second-type application also includes at least one of the wakeup alarm or the non-wakeup alarm; therefore, that the alarm of the second-type application cannot wake up the system in the preset working mode and/or is not woken up by the system when the system is in an awake state specifically includes the following cases:

A1. When the second-type application includes both the wakeup alarm and the non-wakeup alarm, the wakeup alarm and the non-wakeup alarm in the second-type application are suspended. Then, the wakeup alarm in the second-type application cannot actively wake up the system in the preset working mode; after the system is woken up, the non-wakeup alarm in the second-type application cannot be woken up by the awake system either, and therefore cannot trigger the second-type application to start, or to further perform service interaction.

A2. When the second-type application includes only the wakeup alarm, the wakeup alarm is suspended. Then, the wakeup alarm cannot actively wake up the system in the preset working mode.

A3. When the second-type application includes only the non-wakeup alarm, the non-wakeup alarm is suspended. Then, the non-wakeup alarm is not woken up by the system when the system is in the awake state.

In this embodiment of the present invention, when a system enters a preset working mode, a detecting mode 410 detects a first-type application and a second-type application in the system, and a setting module 420 changes a type of an alarm of the first-type application and suspends an alarm of the second-type application, so that the first-type application cannot start the alarm to wake up the system in the preset working mode, and the second-type application does not work temporarily, which reduces power consumption of a mobile terminal, and improves user experience.

Figure 4B:
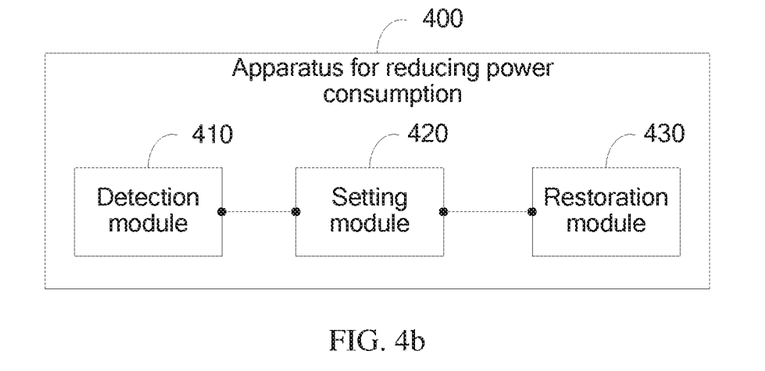
FIG. 4b is a schematic structural diagram of an apparatus for reducing power consumption according to another embodiment of the present invention.

As shown in FIG. 4b, the foregoing apparatus 400 for reducing power consumption may further include:

a restoration module 430, configured to: after the setting module 420 changes the type of the alarm of the first-type application, and suspends the alarm of the second-type application, and after the system is manually woken up, start the first-type application and the second-type application, and restore the alarm of the first-type application and resume the second-type application.

After the system enters the preset working mode, the type of the alarm of the detected first-type application is changed, and the alarm of the second-type application is suspended. Afterwards, after the system is manually woken up, the restoration module 430 may restore the alarm of the first-type application and resume the second-type application by starting the first-type application and the second-type application, that is, a changed type of the alarm of the first-type application is resumed to the previous type, and the alarm of the second-type application is restored, so that a type of the alarm of the second-type application is resumed to the previous type.

Figure 5A:
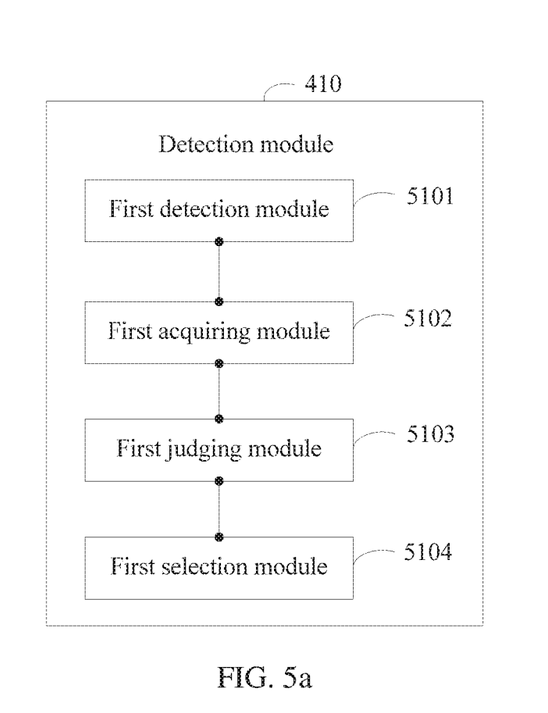
FIG. 5a is a schematic structural diagram of an apparatus for reducing power consumption according to another embodiment of the present invention.

In an embodiment, the first-type application and the second-type application are third-party applications. A third-party application that is not frequently used and has an alarm permit or a wakeup permit is selected as the first-type application, and a third-part application that is not used for a long time and has the alarm permit or the wakeup permit is selected as the second-type application. Therefore, as shown in FIG. 5a, the foregoing detection module 410 specifically includes:

a first detection module 5101, configured to detect third-party applications installed in the system;

a first acquiring module 5102, configured to acquire license information of the third-party applications;

a first judging module 5103, configured to determine, according to the license information, whether the third-party applications have the alarm permit or the wakeup permit; and a first selection module 5104, configured to: after the first judging module 5103 determines that the third-party applications have the alarm permit or the wakeup permit, select the first-type application and the second-type application from the third-party applications that are determined to have the alarm permit or the wakeup permit, where the first-type application is specifically the third-party application that is not frequently used by a user and has the alarm permit or the wakeup permit, and the second-type application is specifically the third-party application that is not used by the user for a long time and has the alarm permit or the wakeup permit.

That the foregoing first selection module 5104 is specifically configured to: after the first judging module 5103 determines that the third-party applications have the alarm permit or the wakeup permit, select the first-type application and the second-type application from the third-party applications that are determined to have the alarm permit or the wakeup permit specifically includes: selecting, according to activity logs, the first-type application and the second-type application from the third-party applications that have the alarm permit or the wakeup permit. An application that is installed by the user but not frequently used is selected as the first-type application according to the activity logs, and an application that is not used for a long time or has never been used is used as the second-type application.

In another embodiment, the third-party applications that have the alarm permit or the wakeup permit can be added to a list, so that the user selects the first-type application and the second-type application from the list, and the system finally determines the first-type application and the second-type application according to a result of use and selection by the user.

This embodiment of the present invention provides the method for detecting a first-type application and a second-type application in a system, where a first detection module 5101 detects third-party applications in the system, and afterwards, a first acquiring module 5102 acquires license information of the third-party applications, a first judging module 5103 determines, according to the license information, whether the third-party applications have an alarm permit or a wakeup permit, and if the third-party applications have the alarm permit or the wakeup permit, a first selection module 5104 further selects the first-type application and the second-type application from the third-party applications that have the alarm permit or the wakeup permit.

Figure 5B:
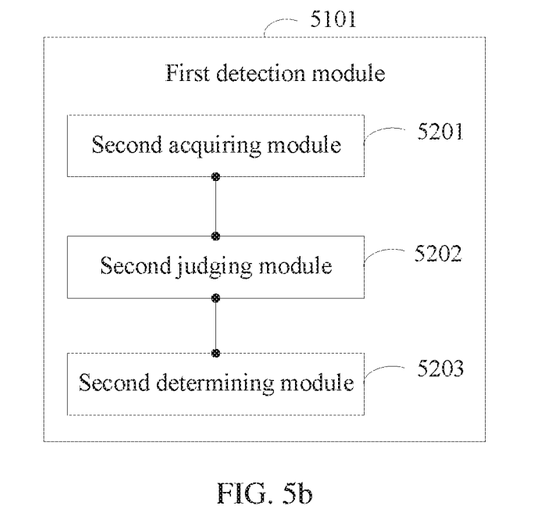
FIG. 5b is a schematic structural diagram of an apparatus for reducing power consumption according to another embodiment of the present invention.

Further, as shown in FIG. 5b, the foregoing first detection module 5101 may specifically include:

a second acquiring module 5201, configured to acquire installation information of an application installed in the system;

a second judging module 5202, configured to determine, according to the installation information acquired by the second acquiring module, whether the application is a system application; and a second determining module 5203, configured to: after the second judging module determines that the application is not a system application, determine that the application is a third-party application.

In this embodiment of the present invention, a third acquiring module 5201 acquires installation information of all applications installed in a system, a third judging module 5202 determines, according to the installation information, whether an application is a system application, and if the application is not a system application, a third determining module 5203 determines that the application is a third-party application. Afterwards, a first acquiring module 5102 acquires license information of third-party applications, a first judging module 5103 determines, according to the license information, whether the third-party applications have an alarm permit or a wakeup permit, and if the third-party applications have the alarm permit or the wakeup permit, a first selection module 5104 further selects a first-type application and a second-type application from the third-party applications that have the alarm permit or the wakeup permit. Specifically, a third-party application that is not frequently used and has the alarm permit or the wakeup permit is selected as the first-type application, and a third-party application that is not used for a long time and has the alarm permit or the wakeup permit is selected as the second-type application.

Figure 6:
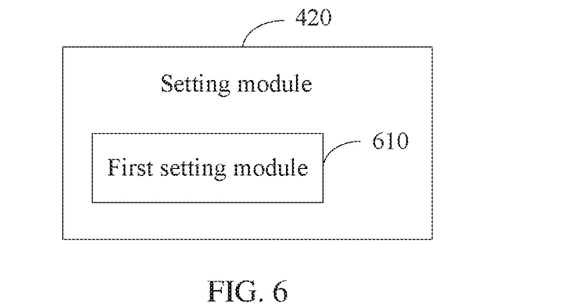
FIG. 6 is a schematic structural diagram of an apparatus for reducing power consumption according to another embodiment of the present invention.

In an embodiment, as shown in FIG. 6, the foregoing setting module 420 specifically includes:

a first setting module 610, configured to change the wakeup alarm in the first-type application to the non-wakeup alarm; and a second setting module 620, configured to suspend the wakeup alarm and the non-wakeup alarm in the second-type application.

In this embodiment of the present invention, when a system of a mobile terminal enters a preset working mode, an apparatus 400 for reducing power consumption starts to detect a first-type application and a second-type application that are installed in the system, and then changes a type of an alarm of the first-type application, and suspends an alarm of the second-type application, so that the alarm of the first-type application cannot wake up the system in the preset working mode, and the second-type application suspends working in the preset working mode, which can reduce power consumption, and improve user experience.

Figure 7:
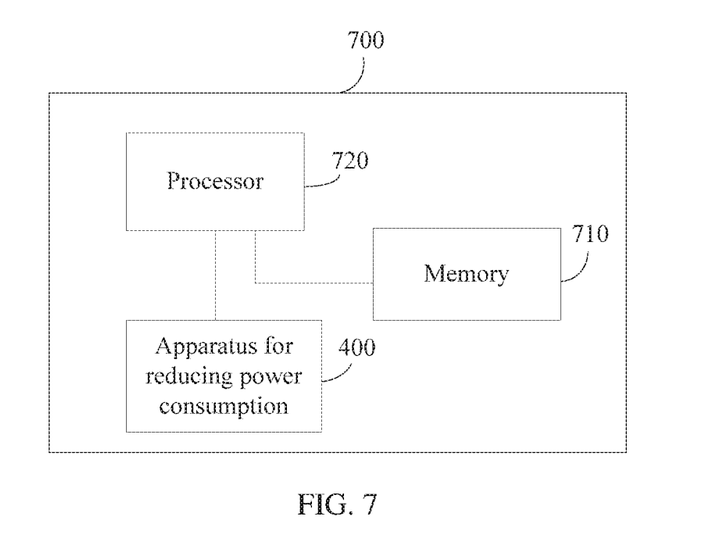
FIG. 7 is a schematic structural diagram of a mobile terminal according to an embodiment of the present invention.

As shown in FIG. 7, an embodiment of the present invention further provides a mobile terminal 700, and the mobile terminal 700 specifically includes: a memory 710, a processor 720, and the apparatus 400 for reducing power consumption provided in the foregoing FIG. 4a to FIG. 6.

The memory 710 is generally mainly configured to store an application in the mobile terminal, the processor 720 is generally mainly configured to execute run the application stored by the memory 710, and when the processor 720 runs the application, the apparatus 400 for reducing power consumption can reduce power consumption generated from application running when the application is executed in the mobile terminal. The memory 710, the processor 720, and the apparatus 400 for reducing power consumption connect to each other by using a network interface or another communications interface.

For a specific implementation process of the apparatus 400 for reducing power consumption, refer to the foregoing description, and details are not described herein again.

In this embodiment of the present invention, when a system of a mobile terminal enters a preset working mode, a first-type application and a second-type application that are installed in the system start to be detected, and then a type of an alarm of the first-type application is changed, and an alarm of the second-type application is suspended, so that the alarm of the first-type application cannot wake up the system in the preset working mode, and the second-type application suspends working in the preset working mode. In this embodiment of the present invention, power consumption of the mobile terminal can be reduced, and user experience can be improved.

Figure 8:
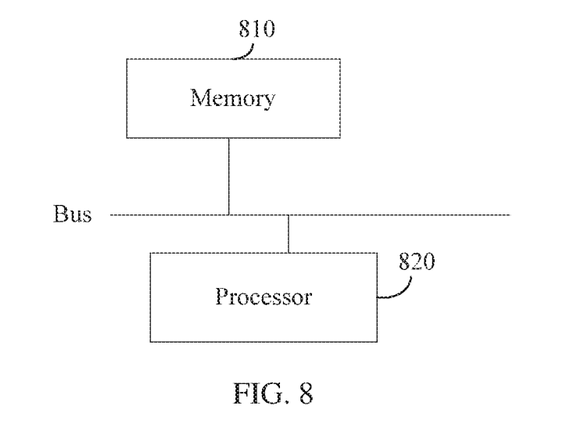
FIG. 8 is another schematic structural diagram of an apparatus for reducing power consumption according to an embodiment of the present invention.

Referring to FIG. 8, FIG. 8 is another schematic structural diagram of an apparatus for reducing power consumption according to an embodiment of the present invention, where the apparatus may include a memory 810, and at least one processor 820 (one processor is used as an example in FIG. 8, for example, a CPU, Central Processing Unit). In some embodiments of the embodiments of the present invention, the memory 810 and the processor 820 may connect to each other by using a bus or in another manner. The processor 820 is configured to execute an executable module stored by the memory, for example, a computer program. The memory 810 may include a high-speed random access memory (RAM, Random Access Memory), and may further include a non-volatile memory (non-volatile memory), such as at least one magnetic disk memory. The at least one network interface (which may be wired or wireless) implements communication connection between a system gateway and at least one other network element over the Internet, a wide area network, a local area network, a metropolitan area network, or the like. In FIG. 8, connection by using a bus is used as an example.

In some embodiments, the memory 810 stores a computer execution instruction, and the processor 820 executes the computer execution instruction in the memory 810, so as to perform the following steps:

when a system enters a preset working mode, detect a first-type application and a second-type application that are installed in the system; change a type of an alarm of the first-type application, and suspend an alarm of the second-type application, so that the alarm of the first-type application cannot wake up the system in the preset working mode, and that the alarm of the second-type application cannot wake up the system in the preset working mode and/or is not woken up by the system when the system is in an awake state.

In some embodiments of the present invention, the foregoing processor 820 may further perform the following steps:

start the first-type application and the second-type application, and restore the alarm of the first-type application and resume the second-type application.

In some embodiments of the present invention, the foregoing processor 820 may further perform the following steps:

detect thirty-party applications installed in the system; acquire license information of the third-party applications; determine, according to the license information, whether the third-party applications have an alarm permit or a wakeup permit; and select the first-type application and the second-type application from third-party applications that are determined to have the alarm permit or the wakeup permit, where the first-type application is specifically a third-party application that is not frequently used by a user and has the alarm permit or the wakeup permit, and the second-type application is specifically a third-party application that is not used by the user for a long time and has the alarm permit or the wakeup permit.

In some embodiments of the present invention, the foregoing processor may further perform the following steps:

acquire installation information of an application installed in the system; determine, according to the installation information, whether the application is a system application; and if the application is not a system application, determine that the application is a thirty-party application.

In some embodiments of the present invention, the foregoing processor may further perform the following steps:

select the first-type application and the second-type application according to activity logs of the third-party applications that have the alarm permit or the wakeup permit.

In some embodiments of the present invention, the foregoing processor may further perform the following steps:

change a wakeup alarm of the first-type application to a non-wakeup alarm; and suspend a wakeup alarm and a non-wakeup alarm in the second-type application.

In some embodiments of the present invention, the foregoing memory may be configured to store the first-type application and the second-type application.

In some embodiments of the present invention, the foregoing memory may be further configured to store the third-party application and the system application.

In some embodiments of the present invention, the foregoing memory may be further configured to store the license information.

In some embodiments of the present invention, the foregoing memory may be further configured to store the installation information.

In the foregoing embodiments, the description of each embodiment has respective focuses. For a part that is not described in detail in an embodiment, reference may be made to related descriptions in other embodiments.

A person of ordinary skill in the art may understand that all or some of the steps of the methods in the embodiments may be implemented by a program instructing relevant hardware. The program may be stored in a computer readable storage medium. The storage medium may include: a read-only memory, a magnetic disk, or an optical disc.

The foregoing describes in detail the method and apparatus for reducing power consumption, and the mobile terminal that are provided in the present invention. A person of ordinary skill in the art may, based on the idea of the embodiments of the present invention, make modifications with respect to the specific implementation manners and the application scope. Therefore, the content of this specification shall not be construed as a limitation to the present invention.

What is claimed is:

1. A method for reducing power consumption, applied to a mobile terminal, the method comprising:

detecting a first-type application and a second-type application that are installed in a system when the system enters a preset working mode; and changing a type of an alarm of the first-type application, and suspending an alarm of the second-type application, so that the alarm of the first-type application does not wake up the system in the preset working mode, and that the alarm of the second-type application cannot wake up the system when the system is in the preset working mode or is not woken up by the system when the system is in an awake state;

wherein the detecting the first-type application and the second-type application that are installed in the system comprises:

detecting one or more third-party applications installed in the system, wherein the first-type application and the second-type application are third-party applications;

acquiring license information of the third-party applications;

determining, according to the license information, whether the third-party applications have an alarm permit or a wakeup permit; and selecting the first-type application and the second-type application from the third-party applications that are determined to have the alarm permit or the wakeup permit, wherein the first-type application is a third-party application that is not frequently used by a user and has the alarm permit or the wakeup permit, and the second-type application is a third-party application that is not used by the user for a predetermined period of time and has the alarm permit or the wakeup permit.

2. The method according to claim 1, wherein the detecting of the third-party application installed in the system further comprises:

acquiring installation information of an application installed in the system;

determining, according to the installation information, whether the application is a system application; and if the application is not a system application, determining that the application is a third-party application.

3. The method according to claim 1, wherein after the changing of the type of the alarm of the first-type application, and suspending the alarm of the second-type application, and after the system is manually woken up, the method further comprises:

starting the first-type application and the second-type application;

restoring the alarm of the first-type application; and resuming the alarm of the second-type application.

4. The method according to claim 1, wherein the selecting of the first-type application and the second-type application from third-party applications that are determined to have the alarm permit or the wakeup permit comprises:

selecting the first-type application and the second-type application according to activity logs of the third-party applications that have the alarm permit or the wakeup permit.

5. The method according to claim 1, wherein the alarm of the first-type application comprises at least one of a wakeup alarm or a non-wakeup alarm, and the alarm of the second-type application comprises at least one of a wakeup alarm or a non-wakeup alarm, and wherein the changing of the type of the alarm of the first-type application comprises:

changing the wakeup alarm in the first-type application to the non-wakeup alarm in the first-type application; and the suspending of the alarm of the second-type application comprises:

suspending the wakeup alarm and the non-wakeup alarm in the second-type application.

6. The method according to claim 1, wherein the preset working mode is a sleep mode.

7. An apparatus for reducing power consumption, applied to a mobile terminal, wherein the apparatus comprises: a bus, a processor, and a memory, wherein the processor and the memory are connected to the bus, the memory is configured to store a computer instruction, and the processor executes the computer instruction to perform the following:

detecting a first-type application and a second-type application that are installed in a system when the system enters a preset working mode; and changing a type of an alarm of the first-type application, and suspending an alarm of the second-type application, so that the alarm of the first-type application cannot wake up the system in the preset working mode; and that the alarm of the second-type application does not wake up the system in the preset working mode or is not woken up by the system when the system is in an awake state;

wherein the detecting the first-type application and the second-type application that are installed in the system comprises:

detecting one or more third-party applications installed in the system, wherein the first-type application and the second-type application are third-party applications;

acquiring license information of the third-party applications;

determining, according to the license information, whether the third-party applications have an alarm permit or a wakeup permit; and after it is determined that the third-party applications have the alarm permit or the wakeup permit, selecting the first-type application and the second-type application from the third-party applications that are determined to have the alarm permit or the wakeup permit, wherein the first-type application is a third-party application that is not frequently used by a user and has the alarm permit or the wakeup permit, and the second-type application is a third-party application that is not used by the user for a predetermined time and has the alarm permit or the wakeup permit.

8. The apparatus according to claim 7, wherein the alarm of the first-type application comprises at least one of a wakeup alarm or a non-wakeup alarm, and the alarm of the second-type application comprises at least one of a wakeup alarm or a non-wakeup alarm; and wherein the processor executes the computer instruction to perform:

changing the wakeup alarm in the first-type application to the non-wakeup alarm in the first-type application; and suspending the wakeup alarm and the non-wakeup alarm in the second-type application.

9. The apparatus according to claim 7, wherein the processor executes the computer instruction to:

after the type of the alarm of the first-type application is changed, and the alarm of the second-type application is suspended, and after the system is manually woken up, start the first-type application and the second-type application, and restore the alarm of the first-type application and resume the alarm of the second-type application.

10. The apparatus according to claim 7, wherein the processor executes the computer instruction to:

acquire installation information of an application installed in the system;

determine, according to the installation information, whether the application is a system application; and after it is determined that the application is not a system application, determine that the application is a third-party application.

11. The apparatus according to claim 7, wherein the processor executes the computer instruction to:

after determining the third-party applications having the alarm permit or the wakeup permit, select the first-type application and the second-type application according to activity logs of the third-party applications that have the alarm permit or the wakeup permit.

12. The apparatus according to claim 7, wherein the preset working mode is a sleep mode.

13. A non-transitory computer-readable storage medium storing computer-executable instructions, the instructions causing a processor to execute a method for reducing power consumption, the method comprising:

detecting a first-type application and a second-type application that are installed in a system when the system enters a preset working mode; and changing a type of an alarm of the first-type application, and suspending an alarm of the second-type application, so that the alarm of the second-type application cannot wake up the system in the preset working mode, and that the alarm of the second-type application does not wake up the system in the preset working mode or is not woken up by the system when the system is in an awake state;

wherein the detecting the first-type application and the second-type application that are installed in the system comprises:
  detecting one or more third-party applications installed in the system, wherein the first-type application and the second-type application are third-party applications;
  acquiring license information of the third-party applications;
  determining, according to the license information, whether the third-party applications have an alarm permit or a wakeup permit; and
  selecting the first-type application and the second-type application from the third-party applications that are determined to have the alarm permit or the wakeup permit, wherein the first-type application is a third-party application that is not frequently used by a user and has the alarm permit or the wakeup permit, and the second-type application is a third-party application that is not used by the user for a predetermined period of time and has the alarm permit or the wakeup permit.

14. The non-transitory computer-readable storage medium according to claim 13, wherein the detecting of the third-party application installed in the system further comprises:
  acquiring installation information of an application installed in the system;
  determining, according to the installation information, whether the application is a system application; and
  if the application is not a system application, determining that the application is a third-party application.

15. The non-transitory computer-readable storage medium according to claim 13, wherein after the changing of the type of the alarm of the first-type application, and suspending the alarm of the second-type application, and after the system is manually woken up, the method further comprises:
  starting the first-type application and the second-type application;
  restoring the alarm of the first-type application; and
  resuming the alarm of the second-type application.

16. The non-transitory computer-readable storage medium according to claim 13, wherein the selecting of the first-type application and the second-type application from third-party applications that are determined to have the alarm permit or the wakeup permit comprises:
  selecting the first-type application and the second-type application according to activity logs of the third-party applications that have the alarm permit or the wakeup permit.

17. The non-transitory computer-readable storage medium according to claim 13, wherein the alarm of the first-type application comprises at least one of a wakeup alarm or a non-wakeup alarm, and the alarm of the second-type application comprises at least one of a wakeup alarm or a non-wakeup alarm, and wherein
  the changing of the type of the alarm of the first-type application comprises:
  changing the wakeup alarm in the first-type application to the non-wakeup alarm in the first-type application; and
  the suspending of the alarm of the second-type application comprises:
  suspending the wakeup alarm and the non-wakeup alarm in the second-type application.

18. The non-transitory computer-readable storage medium according to claim 13, wherein the preset working mode is a sleep mode.

* * * * *